S. T. DAVIS.
PLANT SETTING MACHINE.
APPLICATION FILED APR. 20, 1915.

1,215,125.

Patented Feb. 6, 1917.
4 SHEETS—SHEET 2.

S. T. DAVIS.
PLANT SETTING MACHINE.
APPLICATION FILED APR. 20, 1915.

1,215,125.

Patented Feb. 6, 1917.
4 SHEETS—SHEET 4.

Inventor—
Samuel T. Davis.
by his Attorneys
Nowsm & Nowsm

UNITED STATES PATENT OFFICE.

SAMUEL T. DAVIS, OF PHILADELPHIA, PENNSYLVANIA.

PLANT-SETTING MACHINE.

1,215,125.  Specification of Letters Patent.  Patented Feb. 6, 1917.

Application filed April 20, 1915. Serial No. 22,642.

*To all whom it may concern:*

Be it known that I, SAMUEL THOMAS DAVIS, a citizen of the United States, residing in Philadelphia, Pennsylvania, have invented certain Improvements in Plant-Setting Machines, of which the following is a specification.

My invention relates to machines for setting plants; and the object of my invention is to provide certain improvements over the structure set forth in my prior Patent No. 986,145; my present structure having an improved form of chain for receiving the plants, and improved means for operating the plant holders carried by said chain to receive the plants and to release the same.

A further object of my invention is to provide a simplified construction and a plant setting machine much cheaper in character than those heretofore made.

These and other features of my invention are more fully described hereinafter, reference being had to the accompanying drawings, in which:

Fig. 6, is a perspective view of a portion of the chain and one of the plant carriers mounted thereon, and Fig. 7, is a side elevation of a modified construction within the scope of my invention.

Figure 1:
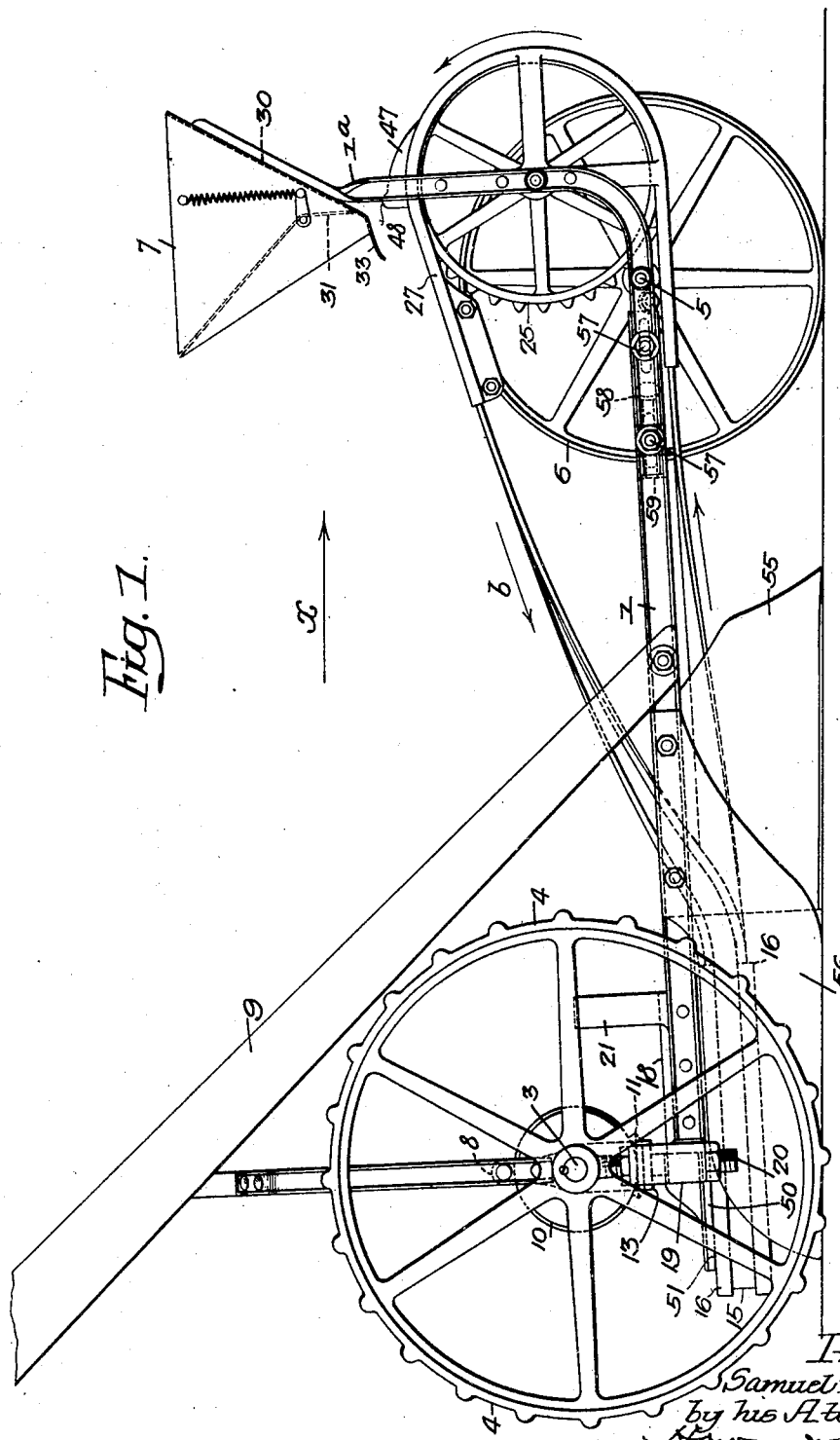
Figure 1, is a side elevation of a plant setting machine made in accordance with my invention.

In the drawings, 1 represents a frame carrying hubs 2, 2, at the rear end for a shaft 3 having traction wheels 4 whereby the machine may be supported and upon which it travels; the various parts of the structure being operated from said shaft. The forward part of the frame carries a stud or spindle 5 for a supporting wheel 6, and has upwardly extending portions 1ª supporting at the upper end a hopper 7. Supplemental supporting members 8 extend upwardly from the hubs 2, 2, which members are connected to arms 9 whereby the structure may be propelled through the ground. If desired, however, the machine may be horse drawn or propelled by a suitable tractor.

Carried by the shaft 3 is a bevel wheel 10 adapted to mesh with a bevel pinion 11 on a vertical shaft or spindle 12; said pinion 11 being supported in a bracket 13 depending from the shaft 3, and the lower end of this shaft or spindle 12 carries a sprocket wheel 15 for guiding and driving a plant carrying chain. The chain is adapted to guides 16, and these guides are supported by depending members 17 from a special form of cross bar 18 having hubs 19 whereby it may be connected to depending screws 20 carried by the hubs 2 receiving the shaft 3; such cross bar having an arched portion 21 for a purpose to be described.

Figure 4:
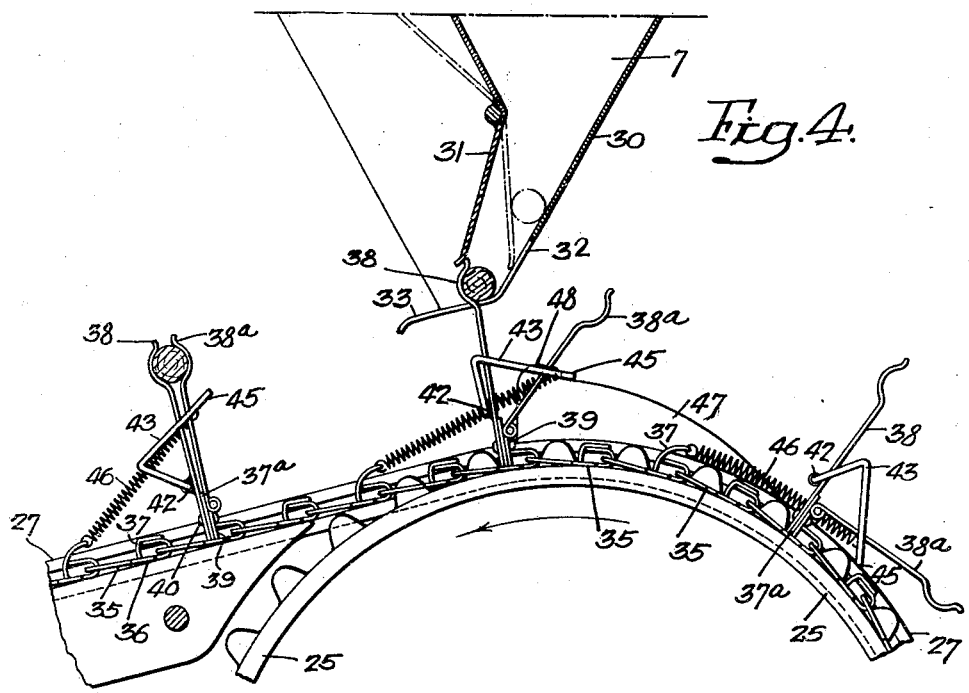
Fig. 4, is an enlarged view of a portion of the structure, partly in section, on the line 4—4, Fig. 2.
Figure 5:
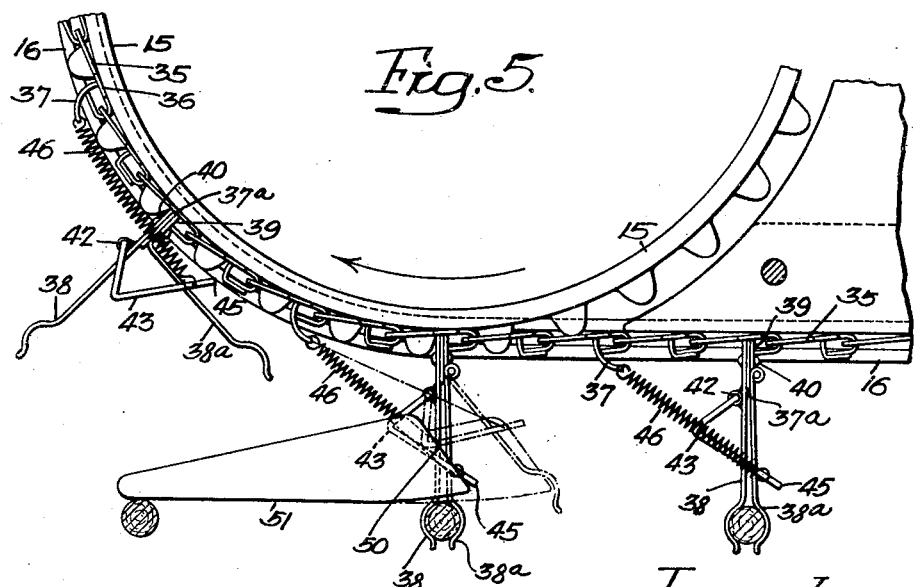
Fig. 5, is an enlarged plan view of a portion of the structure shown in Fig. 1, illustrating the manner of releasing the plants at the setting point.

The forward end of the machine carries a sprocket wheel 25 for the chain, which wheel serves to carry the same beneath the hopper 7, into which plants are dropped, one at a time, and automatically fed to retaining means carried by the chain; such retaining means being more fully shown in Figs. 4, 5 and 6. The guiding channel or track for the chain is arranged, as clearly indicated in Figs. 1 and 2, so as to cause the chain to be disposed in different planes at different points in its travel; such arrangement permitting the plants to be engaged by the chain when passing beneath the hopper and to discharge the plants in a vertical position at the desired setting point. A supplemental channel 27 is carried at the forward part of the machine through which the chain is guided beneath the hopper, and the plant receiving means of the chain are arranged to engage the bottom portion of the hopper, open the same and carry therefrom the single plant disposed in said hopper. The means for effecting this result are more clearly illustrated in Fig. 4.

The hopper 7 carried by the frame of the machine has a fixed wall 30 and a movable wall 31; the lower portion of the fixed wall being cut away at the center as at 32 and having solid portions 33 on opposite sides of said cut away portion.

The chain which I propose to use is made up of a plurality of links 35, having side projections 36, and being connected together by turned portions 37 integral with said links and disposed at right angles to said side projections. At regular intervals throughout the length of the chain, one of these turned portions 37ª is disposed substantially at right angles to the chain, and to it is attached at one side an arm 38, and to the opposite side a plate 39; the parts being secured together by rivets 40 if desired, or other suitable securing means.

The arm 38 has a depression adjacent its end for engagement with a plant to be carried and subsequently set, and hinged to the plate 39 is a second arm 38ª also having a depression, and between these two arms the plant may be confined in its travel to the setting point.

Hinged to the arm 38 at 42 is a lever or arm 43 cut away so as to work freely with reference to the arm 38, and having a slot 44 through which the arm 38ª passes. This plate or lever has a side projection or arm 45 to which a spring 46 is attached; the opposite end of said spring being connected to one of the links in advance of the carrying arm.

The spring, the lever and the arm 38 bear such relation to each other that when the plant carrying members are opened for the discharge of the plants, said spring will lie substantially below the center of the hinge of the lever 43 and will hold said arm in the lowered position. In this way, the plant carrying members are presented to the hopper as shown in Fig. 4.

Mounted on the chain guide just below the hopper is a cam 47, having a forward projection 48, and the side arms of the levers 43 are adapted to engage this cam so that as the chain is moved forward the levers will be lifted, permitting the spring to act and close the fingers 38 and 38ª. Prior to this closing, the finger 38 has passed into the opening at the bottom of the hopper and engaged the movable wall of the same, pushing said wall ahead of it and permitting the plant to be set to drop down into the curved portion at the end of said finger and to remain there until the finger 38ª has contacted therewith upon the release of the lever by the cam. During this engagement and to insure that the plant will be surely supported by the plant holders, such plant is supported by the solid side portions 33 of the bottom of the hopper. If necessary, I may provide a guard for the cam to prevent the rear finger 38ª coming into engagement with the front finger 38 before the plant is in position to be properly engaged thereby.

The plants are fed to the hopper by an operator walking alongside the machine and carrying a supply of the same, and they are dropped in one by one.

Figure 2:
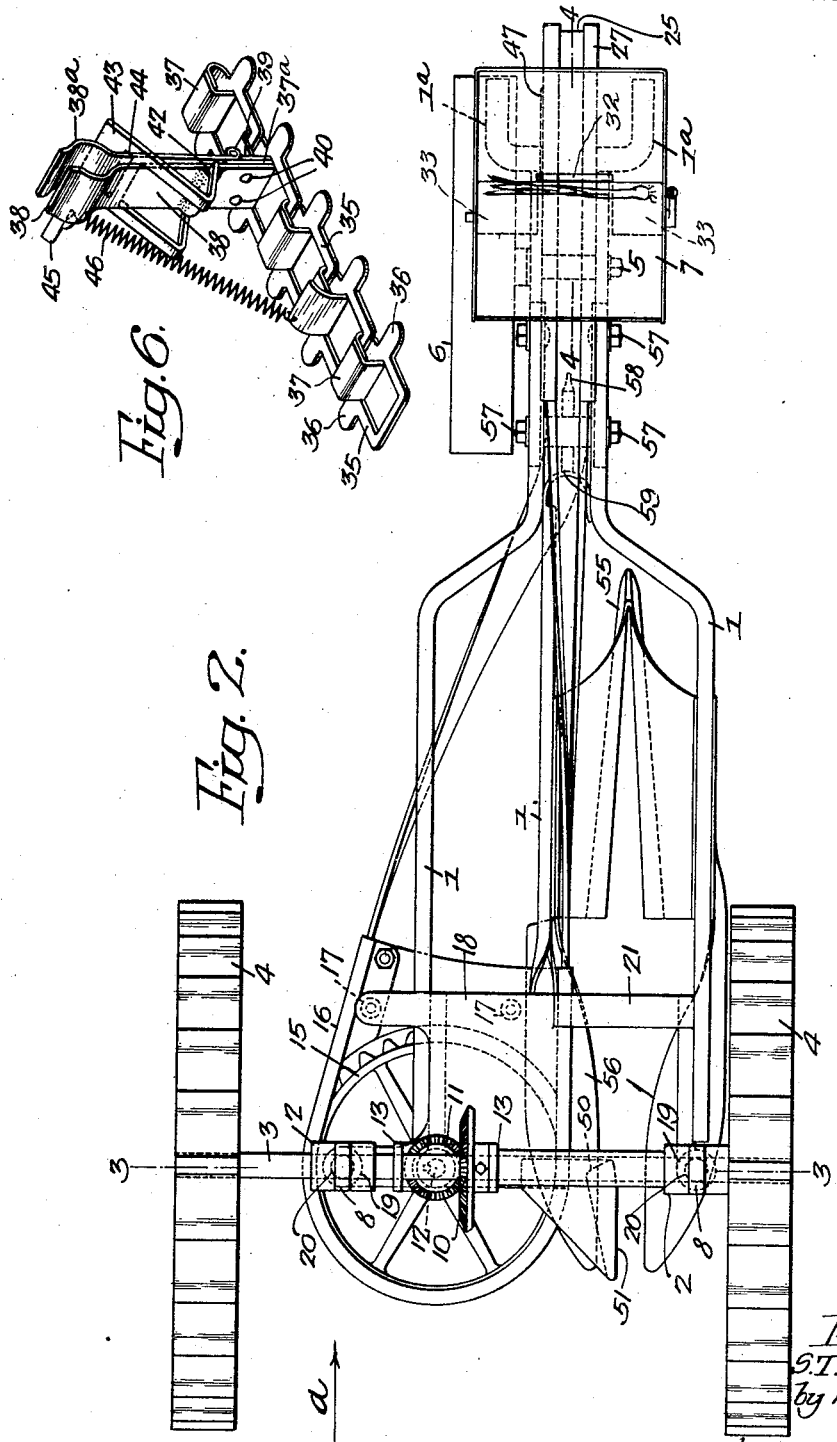
Fig. 2, is a plan view of the same.
Figure 3:
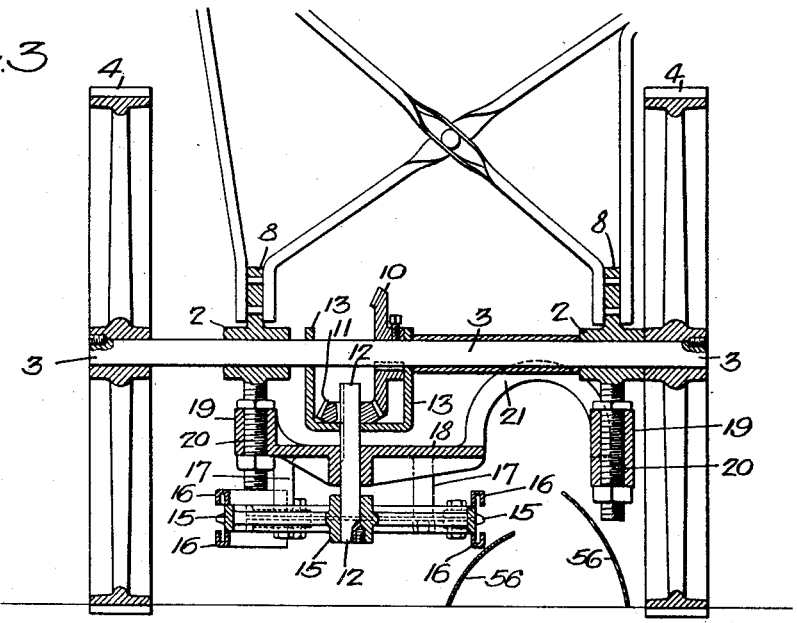
Fig. 3, is a rear elevation of the machine in section on the line 3—3, looking in the direction of the arrow *a*, Fig. 2.

The chain with its plates moves rearwardly to the setting point, as indicated by the arrow b, Fig. 1, (the direction of travel of the machine being indicated by the arrow x) and when the chain with the plant carriers reaches the setting position, the arms of the respective levers are brought into contact with a cam 50 so constructed that as the chain continues its movement, said levers will have their position shifted, as indicated by broken lines in Fig. 5, releasing the plant, which drops in a vertical direction into the previously formed furrow. This action opens the plant holding fingers to the full extent so that they may be held in the open position, ready to return to the hopper for engagement with fresh plants. The crossbar is arched at 21 for the passage of the plants.

The cam 50 has a straight portion or edge 51 against which the plants may lie or rest during the hilling operation so as to insure proper alinement of the same in the row.

The machine is provided with a suitable plow or furrow opener 55 carried by the frame 1, which is offset with respect to the center of the machine, but in line with the position of the plants at the delivery end of the chain, and behind this plow or furrow opener is a pair of hilling blades 56 suitably carried by the frame of the machine.

The forward part of the frame is connected to the other portion by means of bolts 57; one of said bolts carrying a thumb screw 58 adapted to engage a portion 59 of the frame so that after said bolts are loosened and the thumb screw tightened, any slack occurring in the chain may be taken up.

In Fig. 7, I have shown a modified machine in which means are provided to mechanically feed the plants to the hopper. For this purpose, I provide an endless apron 60 having slats 61 extending transversely of the same which are shaped to provide V-shaped pockets 62 deep enough to receive the plants. This endless belt is adapted to suitable wheels or drums 63 and 64 carried by an extension of the front frame which is braced from the rear frame on the arm 66.

A brush 67 is provided for acting upon the plants fed by this endless belt to insure that only one plant will lie in the grooves or spaces between the slats, and this brush may be driven by a chain 70 from a chain wheel 71 on a shaft or spindle 72 carrying one of the belt drums and having an additional sprocket 73, to which motion is imparted by a sprocket chain 74 from a sprocket wheel 75 on the shaft 3.

In this form of the machine, the direction of the movement of the chain is reversed, although the chain is moving in the same direction past the setting point in both forms of the machine. A similar form of hopper is employed, and the plant receiving fingers of the chain are arranged to pick up the plants in a manner entirely similar to that shown in Fig. 4, but engaging the hopper in the opposite direction, however.

I claim:

1. In a plant setting machine, the combination of a frame adapted to be traversed over the ground, an endless chain carried by said frame, means for moving said chain, plant gripping fingers carried by said chain, one of said fingers being fixed to the chain while the other finger is hingedly connected thereto, a slotted plate adapted to one of said fingers and movable to different positions with respect to the same, and a spring connected to said slotted plate and serving to hold the fingers open when the plate is in one position and closed when the plate is in another position.

2. In a plant setting machine, the combination of a frame adapted to be traversed over the ground, an endless chain carried by said frame, means for moving said chain, a pair of plant gripping fingers carried by said chain, one of said fingers having a relatively fixed position with respect to the chain while the other finger is hingedly connected to said chain, a slotted plate hinged to one of said fingers and movable to different positions with respect to the same, and a spring connected to said slotted plate and serving to permit the fingers to hold open when the plate is in one position and to hold the fingers closed when the plate is in another position.

3. In a plant setting machine, the combination of a hopper having a fixed side and a bottom portion, and a movable side, said hopper being adapted to receive plants, an endless chain, gripping means carried by said endless chain, said gripping means adapted to engage and actuate the movable side of said hopper to release the plants, and means for holding said gripping fingers in the open position to receive the plants.

4. In a plant setting machine, the combination of a hopper having a fixed side and a bottom portion, and a movable side, said hopper adapted to receive plants, an endless chain, gripping means carried by said endless chain, said gripping means adapted to engage and actuate the movable side of said hopper to release the plants, means for holding said gripping fingers in the open position to receive the plants, and a cam disposed for releasing said holding means as the gripping fingers engage the movable side of the hopper; the means for holding said gripping fingers in the open position serving also for holding said fingers in the closed position after they leave the hopper.

5. In a plant setting machine, a hopper having a movable side, an endless chain having plant gripping fingers adapted to move the movable side of the hopper and release plants therefrom, and means for closing said fingers upon a plant released from said hopper; the gripping fingers being presented thereto in open position.

6. In a plant setting machine, a hopper for plants, an endless chain having plant gripping fingers, a pair of cams, one cam being adjacent the hopper to close the fingers upon a plant delivered from said hopper, and the other cam being adjacent the setting point to open the fingers and release the plant, said fingers being carried between the setting point and the hopper in open position.

7. In a plant setting machine, the combination of a frame adapted to be traversed over the ground, an endless chain carried by said frame, means for moving said chain, plant gripping fingers carried by said chain, one of said fingers having a relatively fixed position with respect to the chain while the other finger is hingedly connected thereto, a slotted plate hinged to one of said fingers and movable to different positions with respect to the same and to the other finger, a spring connected to said slotted plate and serving to hold the fingers open when the plate is in one position and closed when the plate is in another position, and cams disposed at opposite ends of said machine to open and close said fingers.

8. In a plant setting machine, the combination of a hopper having a fixed side and a bottom portion, and a movable side, said hopper being adapted to receive plants, an endless chain, gripping means carried by said endless chain, said gripping means adapted to engage and actuate the movable side of said hopper to release the plants, means for holding said gripping fingers in the open position to receive the plants, and means for closing said gripping fingers against a plant.

9. In a plant setting machine, the combination of a hopper having a fixed side and a bottom portion, and a movable side, said hopper adapted to receive plants, an endless chain, gripping means carried by said endless chain, said gripping means adapted to engage and actuate the movable side of said hopper to release the plants, means for holding said gripping fingers in the open position to receive the plants, a cam disposed for releasing said holding means as the gripping fingers engage the movable side of the hopper; the means for holding said gripping fingers in the open position serving also for holding said fingers in the closed position after they leave the hopper, and means for feeding plants to said hopper.

10. In a plant setting machine, a hopper having a movable side, an endless chain having plant gripping fingers adapted to move the movable side of the hopper and release plants therefrom, slidable members carried by the chain for closing said fingers upon a plant released from said hopper, and a cam for actuating said slidable members; the gripping fingers being presented thereto in open position.

11. In a plant setting machine, a hopper for plants, an endless chain having plant gripping fingers, a pair of cams, one cam being adjacent the hopper to close the fingers upon a plant delivered from said hopper, and the other cam being adjacent the setting point to open the fingers and release the plant, said fingers being carried between the setting point and the hopper in open position, and the cam at the setting point having an extended straight side to position and hold the plants in alinement, and means for closing earth around said plants.

12. In a plant setting machine, the combination of a plant delivering hopper having a movable side, an endless carrier, plant gripping means mounted on said carrier and adapted to engage and actuate the movable side of said hopper to release plants therefrom, means for maintaining said gripping means in the open position to receive a plant, and a cam for releasing said holding means as the gripping means engage the movable side of the hopper, the means for holding said gripping means in the open position serving also to hold the gripping means in engagement with a plant after it leaves the hopper.

13. In a plant setting machine, the combination of a delivery hopper having a fixed side and bottom portion, the said bottom portion extending laterally beyond the opposite side of the hopper, and a movable side, said hopper adapted to receive plants, an endless carrier, plant gripping means mounted on said carrier and adapted to engage and actuate the movable side of said hopper to release the plants, means for holding said gripping means in the open position to receive the plants, and a cam for releasing said holding means as the gripping means engage the movable side of the hopper, the means for holding said gripping means in the open position serving also to hold the gripping means in engagement with a plant after it leaves the hopper.

14. In a plant setting machine, an endless carrier for conveying the plants arranged to move when the machine is operated, gripping means mounted on said carrier and movable to open and closed positions, means for holding said gripping means in open and closed positions, a cam for opening said gripping means disposed at one position with respect to the run of the carrier, and a cam for closing said gripping means disposed at another position with respect to the run of the carrier.

15. In a plant setting machine, an endless carrier for conveying plants, gripping fingers mounted on said carrier and movable to open and closed positions, means for holding said fingers in open and closed positions, a cam for opening said fingers disposed at one position with respect to the run of the carrier, and a cam for closing said fingers disposed at another position with respect to the run of the carrier.

16. In a plant setting machine, an endless carrier for conveying plants, means for moving said carrier as the machine is operated, pairs of gripping fingers mounted on said carrier, one finger of each pair being movable with respect to the other to open and closed positions, means for holding the movable finger in an open and closed position, a cam for moving said finger to the open position disposed at one point with respect to the run of the carrier, and a cam for moving said finger to the closed position disposed at another point with respect to the run of the carrier.

17. In a plant setting machine, a plant carrier comprising an endless conveyer and plant gripping members carried thereby, said members comprising an arm extending substantially at right angles to the conveyer and a second arm pivotally mounted and free to swing with respect to the first, a slotted member pivotally mounted through which the pivotally mounted arm passes, and a spring connected to the free end of said slotted member and at its opposite end to the conveyer, said spring lying below the pivotal connection of the slotted member when the gripping members are open to hold them in the open position, and above the pivotal connection of the slotted member when the gripping members are closed to hold them in the closed position.

18. In a plant setting machine, a plant carrier comprising an endless conveyer and plant gripping members carried thereby, said members comprising an arm extending substantially at right angles to the conveyer and a second arm pivoted to the first, a slotted member pivotally connected to the first arm and through which the second arm passes, and a spring connected at one end to said slotted member and at the opposite end to the conveyer, said spring lying below the pivotal connection of the slotted member when the gripping members are open to hold them in the open position, and above the pivotal connection of the lever when the gripping members are closed to hold them in the closed position.

19. In a plant setting device, an endless conveyer, plant gripping devices carried by said conveyer comprising an arm extending substantially at right angles to said conveyer and a pivotally mounted second arm, a coiled spring movable with respect to said arm to hold them in open and closed positions, an L-shaped member pivotally mounted and slotted for the reception of the movable arm, and means for shifting said L-shaped member so as to move the pivoted arm to open and closed positions, said spring serving also for holding said L-shaped member in its respective positions.

20. In a plant setting device, an endless conveyer, plant gripping devices carried by said conveyer comprising an arm extending substantially at right angles to said conveyer and a second arm pivotally connected to the first, a coiled spring movable with respect to said arms to hold them in open and closed positions, an L-shaped member pivotally connected to the relatively fixed arm and slotted for the reception of the movable arm, and means for shifting said L-shaped member so as to move the pivoted arm to the open and closed positions, said spring serving also for holding said L-shaped member in its respective positions.

SAMUEL T. DAVIS.

Copies of this patent may be obtained for five cents each, by addressing the "Commissioner of Patents, Washington, D. C."